March 27, 1962      H. V. HANSEN      3,027,050

MULTI-PARTITIONED HOPPER WITH TAPERED AUGER DISTRIBUTOR

Filed Feb. 27, 1959

INVENTOR.

HAROLD V. HANSEN

ATTORNEYS

3,027,050
MULTI-PARTITIONED HOPPER WITH TAPERED AUGER DISTRIBUTOR

Harold V. Hansen, Hillsdale, Ill., assignor to Deere & Company, Moline, Ill., a corporation of Delaware
Filed Feb. 27, 1959, Ser. No. 796,033
1 Claim. (Cl. 222—136)

The present invention relates generally to agricultural implements and more particularly to fertilizer distributors and other material dispensers.

The object and general nature of this invention is the provision of means whereby the farmer or other operator may secure the desired composition of the material to be dispensed by the use of what might be termed a mixing hopper in which a plurality of compartments are provided, with auger means so constructed and arranged to deliver material from all of the compartments to a point or points of discharge and operating to remove from each compartment the correct proportions of the material component therein. More particularly, it is a feature of this invention to provide an elongated hopper having tapered augers in the bottom portion thereof and means providing a plurality of compartments in the hopper, the augers being constructed and arranged so that each compatrment supplies its proportionate amount of material to the total being dispensed.

These and other objects and advantages of the present invention will be apparent to those skilled in the art after a consideration of the following detailed description, taken in conjunction with the accompanying drawings, in which.

Figure 1:
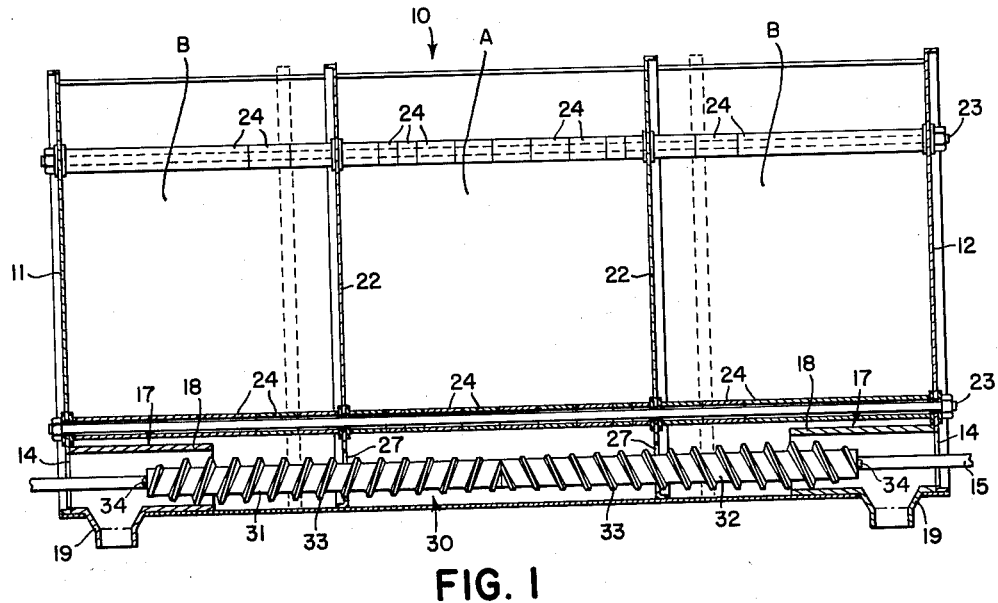
FIG. 1 is a vertical longitudinal section taken generally midway through a dispensing hopper in which the principles of the present invention have been incorporated.
Figure 2:
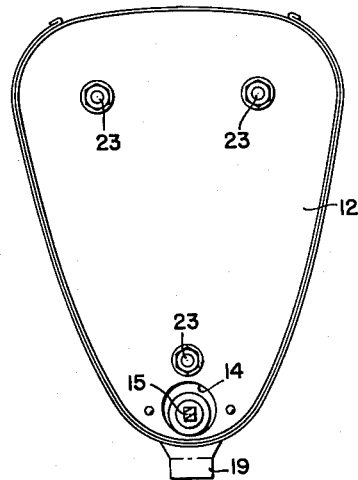
FIG. 2 is an end view of the construction shown in FIG. 1.

Referring first to FIG. 1, the hopper is indicated in its entirety by the reference numeral 10 and comprises end walls 11 and 12 having a configuration best shown in FIG. 2, and curved side and bottom walls. The lower portion of each of the ends walls 11 and 12 is provided with an opening 14 through which a drive shaft 15, preferably square in cross section, is disposed. The hopper 10 adjacent each end wall portion is provided with outlet means 17 that preferably takes the form of a short sleeve 18 having a downwardly extending discharge spout section 19 disposed adjacent the plane of the associated hopper end wall.

A plurality of partitions 22 are disposed in the hopper 10 between the end walls 11 and 12 and, generally speaking, the partitions 22 have substantially the same configuration as the end walls 11 and 12. The partitions 22 are secured in position by elongated bolt members 23 that at their ends extend outwardly through apertures formed in the end walls 11 and 12, the bolts 23 extending the entire length of the hopper as shown in FIG. 1. Also, the bolts 23 extend through apertures in the partition walls 22. Disposed on each of the blots 23 is a plurality of sleeves 24 of various lengths, as shown in FIG. 1. These sleeves are disposed at opposite sides of the partitions 22 and occupy substantially the full length of each of the associated through bolts 23.

The position of the partitions 22 in the hopper may be varied, as desired, by taking out the bolts 23 and the sleeves 24, shifting the partitions, or either of them, to different positions in the hopper, and then reinserting the bolts through the sleeves, disposing them in the proper position on the bolts to accommodate the new position of the partition or partitions 22. The dotted line positions of the partitions 22 shown in FIG. 1 illustrates how the center compartment A may be increased and the end compartments B reduced in size. The end compartments B, or either of them, may be increased in a similar way. There is a sufficient number of sleeves 24 of different lengths to provide whatever adjustment of the partition wall 22 may be required.

The lower portion of each of the partition walls 22 is formed with an opening 27 through which auger means, indicated in its entirety by the reference numeral 30, extends. The auger means is mounted for rotation in supported fashion by the inner end portions of the sleeves 18 upon which the larger end sections of the auger flights rest. It will be seen from FIG. 1 that, first, the auger means 30 includes two auger sections 31 and 32 of opposite hand, and second, that the flights 33 on the auger sections 31 and 32 progressively increase in diameter and depth from their inner or adjacent ends to their outer ends, the smaller auger ends being disposed in the center comparement A while the larger auger ends are disposed in communication with the end compartments B. The augers have square holes to receive the shaft 15 and by virtue of this construction, the auger means 30 is driven when the shaft 15 is rotated, which is done by any suitable means. Cotters 34 hold the augers on the shaft.

The operation of the form of the invention shown in the accompanying drawings is substantially as follows.

Since the flights or flanges 33 on the auger sections are of opposite hand and, passing from the inner end outwardly to the outer ends, of constantly increasing depth and capacity, during rotation of the auger means 30, the amount of material picked up in the center compartment A will be proportional to the average depth or height of the flange or flight portion 33 lying within the compartment A. The material picked up by the inner portions of the augers is moved outwardly by the latter into the compartments B where the flights or flanges are of the increased depth, and thus additional quantities of material in the compartments B are picked up and mixed with the material picked up in the compartment A so that the material as dispensed from the outlet means 19 is a mixture of material from compartment A and compartment B and proportional generally to the portions of the auger flights that are exposed and operative in the respective compartments. If, as shown in dotted lines in FIG. 1, the partition walls 22 are moved outwardly, thus enlarging the compartment A, then the material dispensed through the outlet means 19 will contain a greater proportion of materal from the compartment A as compared with the quantity from compartments B. Thus, a farmer may, for example, purchase the elemental components of the fertilizer he desires and can adjust the compartment walls 22 to secure substantially the mixture his soil requires. Further, he may vary, as from field to field, the composition of the material disposed merely by emptying the hopper and changing the partitions. Operating in this way, the cost of the fertilizer is materially reduced as compared with purchasing fertilizer already mixed in the proportions desired.

While I have shown and described above the preferred structure in which principles of the present invention have been incorporated, it is to be understood that my invention is not to be limited to the particular means, shown and described above, but that, in fact, widely different means may be employed in the practice of the broader aspects of my invention.

What I claim, therefore, and desire to secure by Letters Patent is:

In a fertilizer distributor, an elongated hopper having ends, a plurality of movable partition walls adjustably disposed in the hopper to form separate compartments there in, means supporting said partition walls in different positions of adjustment within the hopper, comprising a plurality of elongated parts extending from one end of the hopper to the other, the partition walls having opening receiving said elongated parts, a plurality of sleeves disposed on said parts at opposite sides of said partition walls, said sleeves being of different lengths and optionally disposable at one side or the other of said walls for holding the latter in different positions of adjustment, said sleeves extending substantially from end to end on said parts and thereby protecting the latter from direct contact with the fertilizer means carried by the hopper forming an outlet adjacent one end of the hopper and at the lower portion thereof, each of said movable partition walls having an opening in the lower portion thereof adjacent the bottom of the hopper and said partition openings being in alignment, and a tapered auger disposed in all of said compartments and extending through said partition openings to said outlet means.

References Cited in the file of this patent

UNITED STATES PATENTS

| | | |
|---|---|---|
| 900,227 | Svenson | Oct. 6, 1908 |
| 1,001,853 | Jacobson | Aug. 29, 1911 |
| 1,593,517 | Tharrington | July 20, 1926 |
| 1,726,812 | Eggert | Sept. 3, 1929 |
| 1,738,349 | Brich | Dec. 3, 1929 |
| 2,478,079 | Beasley et al. | Aug. 2, 1949 |